United States Patent
Giraud

[15] 3,680,893
[45] Aug. 1, 1972

[54] CONNECTING DEVICES INCORPORATING A LOCKING SYSTEM

[72] Inventor: Abel C. Giraud, 69, rue Gaultier, 92 Courbevoie, France

[22] Filed: July 24, 1969

[21] Appl. No.: 844,529

[30] Foreign Application Priority Data

July 30, 1968 France..................68161260

[52] U.S. Cl. ..............285/39, 285/316, 285/320, 285/DIG. 21
[51] Int. Cl. .............................F16l 37/08
[58] Field of Search........285/316, 277, 39, 320, 327, 285/328, DIG. 21, DIG. 20

[56] References Cited

UNITED STATES PATENTS 3,052,488  9/1942  Bruning..............285/DIG. 21
3,199,553  8/1965  Garrett et al..........285/DIG. 21

Primary Examiner—Thomas F. Callaghan
Attorney—Breitenfeld & Levine

[57] ABSTRACT

An auxiliary device for the remote control of an axially lockable connection comprising a lever system whereby movement of at least one accessible long lever arm operates a shorter lever arm to actuate an unlocking element.

4 Claims, 16 Drawing Figures

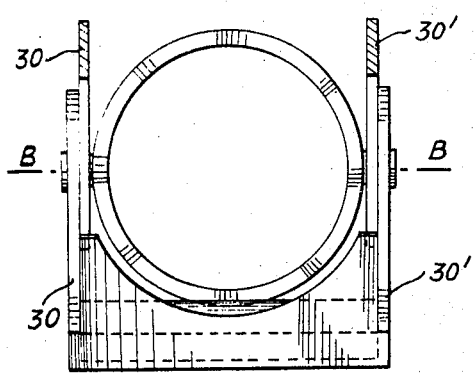
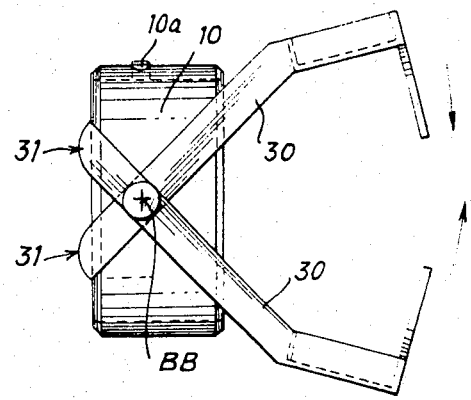
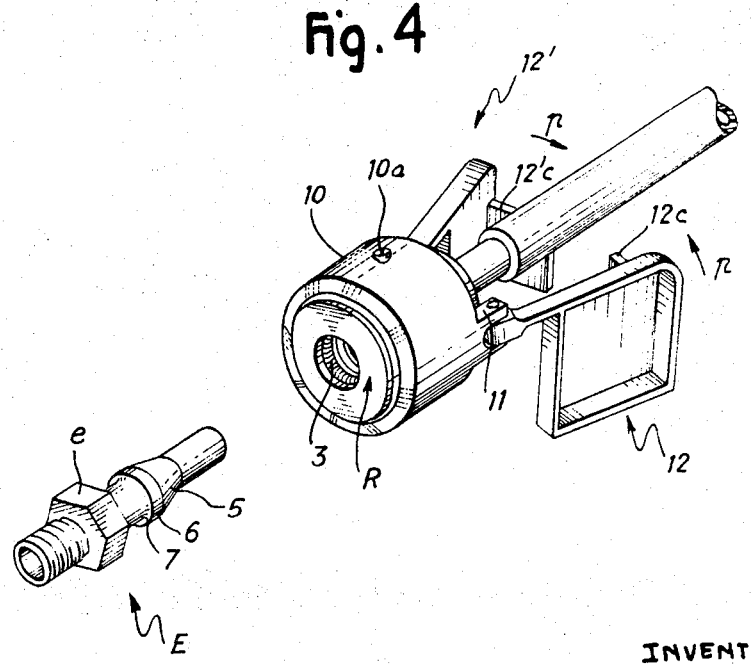

PATENTED AUG 1 1972 3,680,893

INVENTOR:
ABEL C. Y. E. GIRAUD
By
Butterfield & Lewis
ATTORNEYS

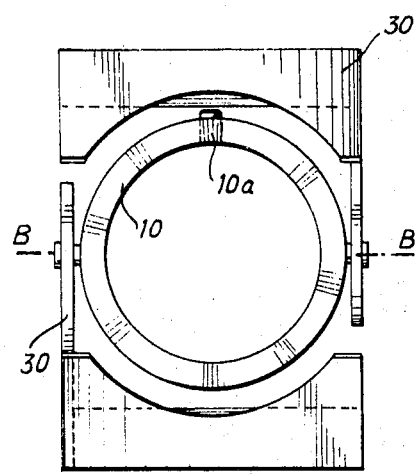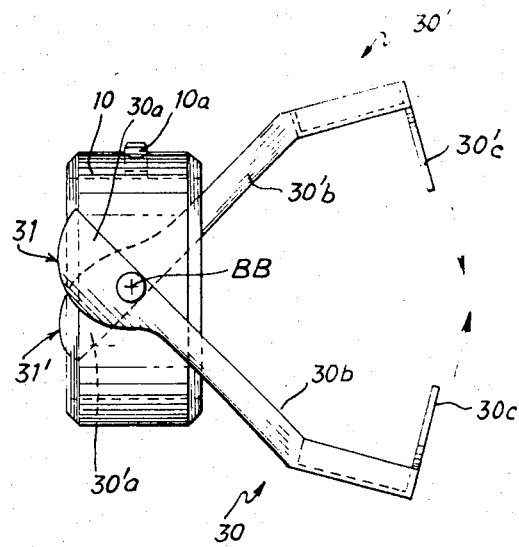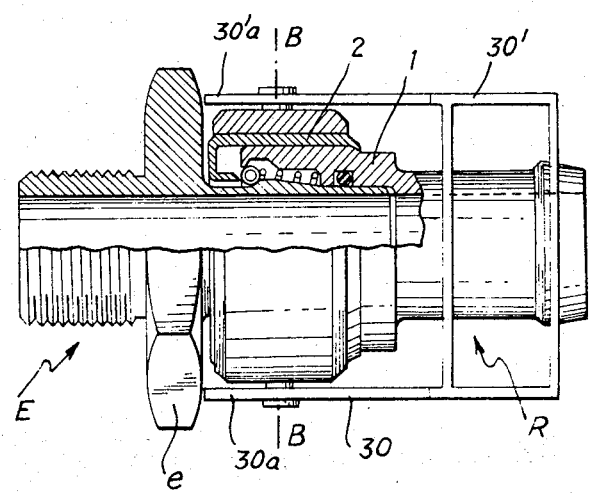

CONNECTING DEVICES INCORPORATING A LOCKING SYSTEM

In many fields of technology use is made of connecting devices incorporating a locking system; this applies more particularly to connecting elements for ducting for the transportation of liquid or gaseous fluids, or to devices for connecting simple or complex electric transmission line members to one another. Hereinafter the term "connection" will be used to mean both kinds of device.

The invention relates more particularly to connections whose locking and unlocking requires a relative movement between at least two connection members parallel with the direction of the connection and of the two aligned members which the connection assembles end to end. Hereinafter connections of this kind will be called "axially locking connections".

Connections of the kind specified have been known for many years. They are unlocked, for instance, by making an outer ring slide over the connection body against the force of a locking spring. Unlocking is thus performed by an axial thrust which is of the order of 4 kg-force for normal ducting connections. Whenever control is directly manual there is no difficulty in using devices of this kind (locking and unlocking). Difficulties crop up however when they are to be operated from a distance via mechanical hands in remote control systems of the "master-slave" kind; remote control is of course often needed to protect operatives against certain harmful atmospheres, inter alia radioactive atmospheres, in which the connections are often used. It has been found that the mechanical hand seizes the connection inadequately, a member of this kind operating by gripping is not very suitable for producing axial thrust in a direction perpendicular to the gripping direction, and the locking force of the connections is often excessive for the remote control system.

It is an object of the invention to obviate these disadvantages without altering the structure or characteristics of the connections used; to this end the invention provides an auxiliary member which can be mounted on all connections to facilitate remote control operation.

The invention also relates to a connection having an auxiliary member to facilitate the remote control operation of the connection, said member being unitary with the connection.

More precisely the present invention relates by way of a novel industrial product to an auxiliary member for the remote control operation of an axially locking connection, mainly comprising a fitting which can be attached to the body of the connection, and an unlocking assembly comprising at least one mobile lever whose displacement by a mechanical gripper hand produces a suitably stepped-down displacement of the fitting.

Preferably, the fitting is a cylindrical ring.

In a first embodiment of the invention the unlocking assembly comprises a pair of symmetrical bent levers mounted at one end of the ring, each bent lever comprising a minor axially moving unlocking arm and a major radially moving maneuvering arm.

In a second embodiment of the invention the unlocking assembly comprises a lever pivoting tangentially in relation to the ring and associated with an unlocking eccentric projecting inside the ring.

In a third embodiment of the invention the unlocking assembly comprises at least one lever pivoting tangentially in relation to the cylindrical ring and comprising an unlocking arm acting by cam effect and a maneuvering arm.

In a fourth embodiment of the invention the unlocking assembly mainly comprises a fitting which can be attached to the maneuvering ring of the connection and a maneuvering assembly enabling the maneuvering ring to slide axially over the connection. The maneuvering assembly comprises a second ring unitary with the connection in the axial and radial directions and spaced out from the maneuvering ring by co-operation between a cam and a cam path, a first lever unitary with the maneuvering ring and a second lever unitary with the second ring. As a result of this arrangement, relative movement of the levers by rotation around the axis of the connection displaces the maneuvering ring axially over the connection and thus operates the locking thereof.

More precisely, this fourth embodiment of the invention is adapted to co-operate with a connection of the kind with an axis of revolution, the connection comprising a body and a first ring sliding on the body and urged axially by a spring, the ring performing locking and unlocking of the connection in its two axial end positions, the device comprising:

A second ring coaxial with the connection body and unitary therewith, the axial traversing movement of the second ring in the axial direction being limited by a stop on the connection body co-operating with a first surface of the second ring, the second ring comprising two substantially helical ramps disposed symmetrically of the axis on a second surface of the second ring parallel with and opposite to the first surface;

Two pins disposed radially and symmetrically of the axis, the pins being unitary with the first ring via a fitting and co-operating with the ramps of the second ring in response to the action of the spring;

The first radial lever unitary with the first ring and the second radial lever unitary with the second ring, the two levers forming an acute angle when the first ring occupies its radial end position responding to the urging of the spring;

So that gripping which brings together the two levers angularly causes a relative movement of the pins and the ramps causing an axial displacement of the first ring oppositely to the said axial direction, thus operating the connection. The attachment of the pins fitting to the first connection ring can be detachable, in which case the device according to the invention forms an auxiliary member for operating a connection of known type.

Alternatively, the attachment can be irremovable, so that the device according to the invention forms an axially locking connection controlled by a radially gripping action.

The embodiments of the invention will be better understood from the following description with reference to the accompanying non-limitative exemplary drawings, wherein:

FIGS. 3 and 4 are a partly axially sectioned plan view and a perspective view respectively of the auxiliary member according to the invention combined with an axially locking connection;

Figure 1:
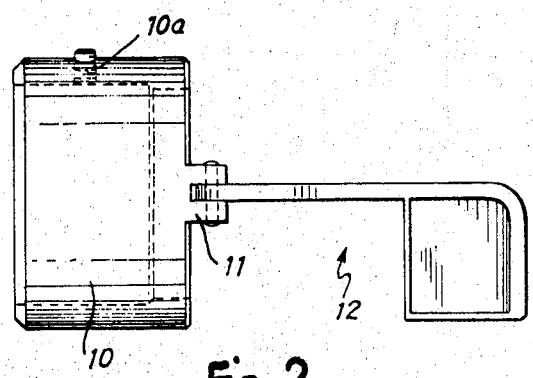
FIGS. 1 and 2 are an elevation and view from the right-hand side respectively of the first embodiment of the auxiliary member according to the invention.
Figure 2:
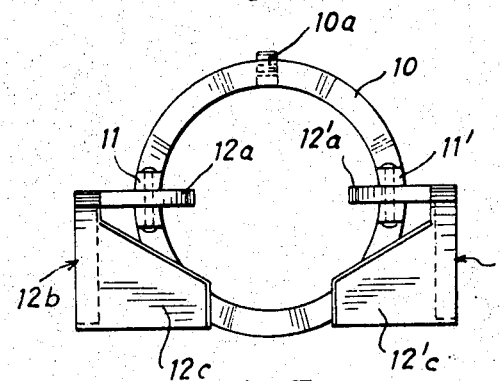
Figure 3:
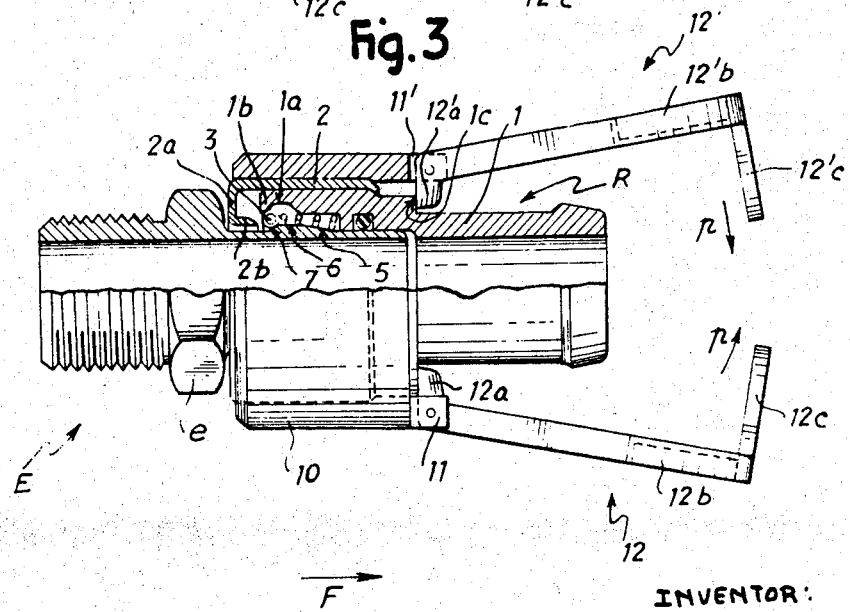
Figure 6:
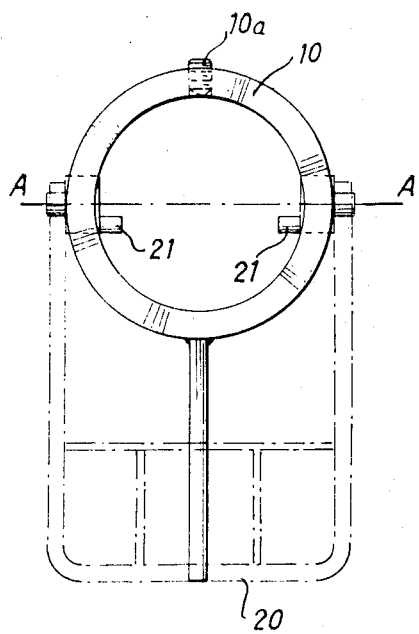
Figure 5:
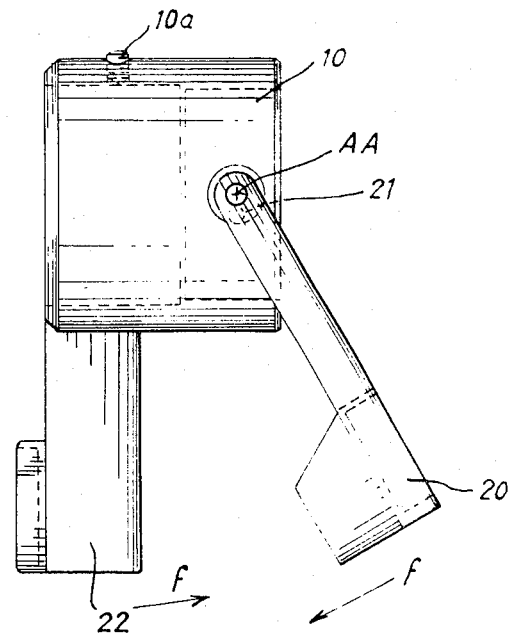
Figure 7:
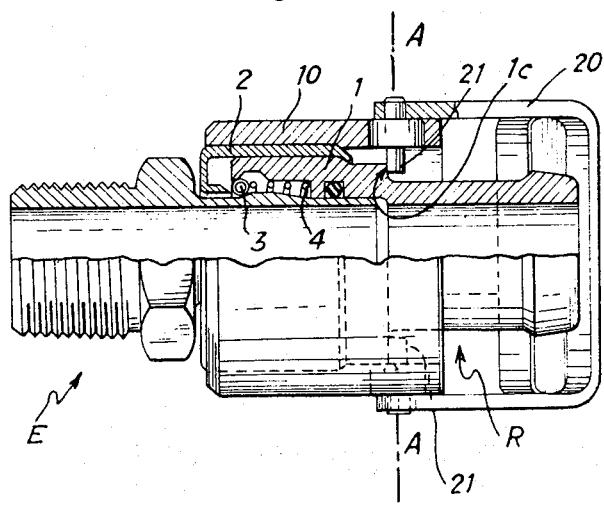
Figure 11A:
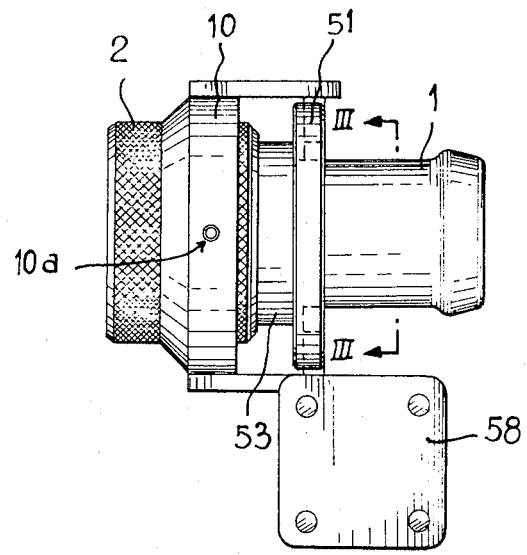

FIGS. 5-7 correspond to FIGS 1-3 but illustrate a second embodiment;

FIGS. 8-10 correspond to FIGS. 1-3 and illustrate a third embodiment of the invention;

FIGS. 8a and 9a showing a variant construction;

FIG. 11a is an elevation of the device according to the invention

Figure 11B:
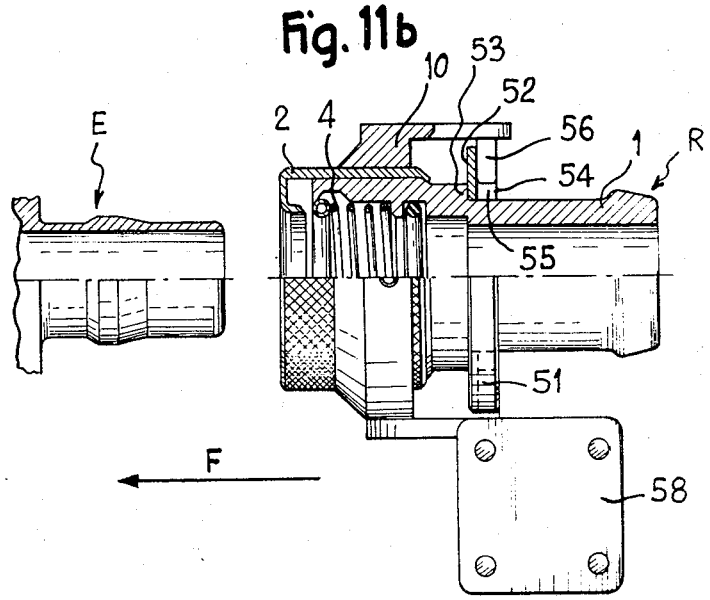
Figure 11C:
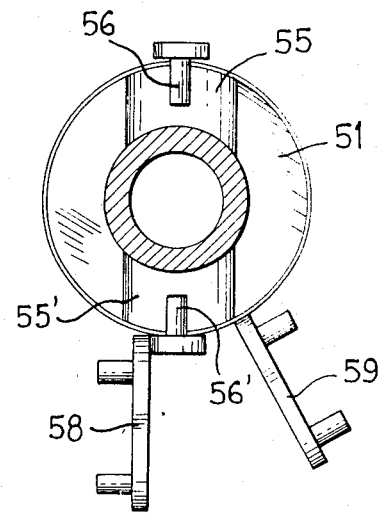
Figure 11D:
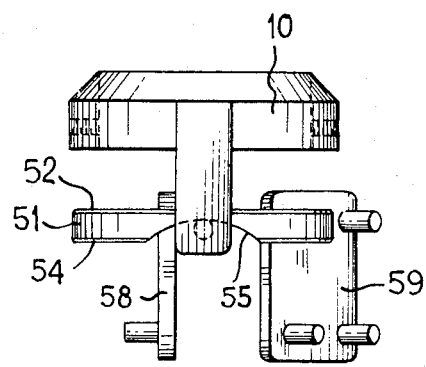

FIG. 11b is a longitudinal section through the device shown in FIG. 11a;

FIG. 11c is a view of the same device, sectioned along the line III-III in FIG. 11a, and FIG. 11d is a bottom plan view of the device shown in FIG. 11a.

In the drawings like elements have like references. To illustrate the use of the invention, it is shown applied to a self-locking connection of known type which is unlocked by a deliberate operation.

An axial locking connection R of the kind specified comprises in known manner an inner body 1 and an outer unlocking ring 2. The body 1 is formed with a recess 1a bounded by a lip 1b, an expansible locking member 3 and a locking spring 4 always tending to urge the member 3; the ring 2 comprises a flange 2a having an unlocking lip 2b. A connection R is locked on an end E comprising a slightly sloping peripheral ramp 5 turned towards the connection R, a cylindrical land 6 and a strongly inclined peripheral ramp 7 sloping in the opposite direction. On locking (FIG. 3), the member 3 is interposed between the ramp 7 and the lip 1b. Unlocking is performed by the axial displacement of the ring 2 relative to the body 1 in the direction F; the unlocking lug 2b acts on the member 3, radially urging the latter into the recess 1a (cf. FIGS. 3, 4, 7, 10). Of course this connection is shown merely as an example of an axially locking device.

In its first embodiment (FIGS. 1-4) the member according to the invention comprises a cylindrical ring 10 which can be mounted on the periphery of the connection R, a locking screw 10a and two levers 12, 12' symmetrically mounted to pivot on two bearings 11, 11' extending from one end of the ring 10. Each of the levers 12, 12' comprises a minor unlocking arm 12a, 12'a, a major maneuvering arm 12b, 12'b and an end-of-travel stop 12c, 12'c, each of the arms 12a, 12'a being able to co-operate with a shoulder 1c of the frame 1. The bringing together of the two arms 12a, 12'a by radial gripping in the direction indicated by the arrows p causes the unlocking by relative displacement in the axial direction of the body 1 and the ring 2; a considerable step-down in force is ensured by the difference in length between the arms 12a, 12'a and 12b, 12'b.

In the second embodiment also (FIGS. 5-7) the auxiliary member comprises a ring 10 and a locking screw 10a; the unlocking member is a double lever 20 pivoting around a transverse radial axis AA and associated on both sides of the ring with an eccentric 21. Unlocking is performed by the gripping of the lever 20 and the fixed lever 22 associated with the ring 10, in the direction f; during this movement the eccentrics 21 act on the shoulder 1c.

In the third embodiment (FIGS. 8-10) the supporting surface used for the unlocking is a nut e unitary with the end E. In this case the unlocking members comprise two levers 30, 30' mounted on either side of the ring 10 around a radial axis BB. Each lever 30, 30' comprises an unlocking arm 30a, 30'a, a maneuvering arm 30b, 30'b, an end-of-travel stop 30c, 30'c. The unlocking arms 30a, 30'a act via cam surfaces 31, 31' on the nut e of the end E. Unlocking is performed by bringing the arms 30b, 30'b together, thus causing the paths of cams 31, 31' to act on the nut e, repelling the ring 2 away from the end E – i.e., in the direction of the connection body 1.

FIGS. 8a, 9a which resemble FIGS. 8 and 9, show a variant in which the levers 30, 30' are duplicated on each side of the ring.

In the fourth embodiment (FIGS. 11a – 11d) the device according to the invention comprises a second ring 51 unitary with the body 1 and so disposed that a first surface 52 of the ring 51 contacts a stop in the form of a shoulder 53 of the body 1. The ring 52 comprises two part cylindrical, transverse notches 55, 55'. The shape of the notches enables them to act as substantially helical ramps for two pins 56, 56' unitary with a fitting 10. The fitting 10 is attached by screws 10a to the first ring 2; in another embodiment the fitting 10 is completely unitary with the ring 2.

The fitting 10 transmits to the pins 56, 56' the thrust exerted in the direction indicated by the arrow F by the spring 4 on the ring 2. The pins 56, 56' are therefore firmly applied in the notches 55, 55' and push the ring 51 against the stop 53.

A first radial lever 58 is unitary with the fitting 10, and a second radial lever 59 is unitary with the ring 51. As can be seen more particularly in FIG. 11c, the levers 58, 59 form an angle of about 45° with one another when the pins 56, 56' are in contact with the bottom of the notches 55, 55' - i.e., when the position of the pins in the notches corresponds to the urging of the spring 4.

A gripping force tending to bring the levers 58, 59 close to one another, reducing the angle thereof, results in the ring 51 rotating relatively to the ring 2. As a result of this relative displacement, the pins 56, 56' run up along the lateral ramps of the notches 55, 55' thus bringing the rings 2 and 51 close to one another against the force of the spring 4. The displacement of the ring 51 being limited in the direction of this approaching movement by the stop 53, the ring 2 moves in the opposite direction from that indicated by the arrow F, so that the end E is unlocked from the connection member R.

The spring 4 always tends to move the rings 2 and 51 apart so that the device according to the invention has no clearance. It can also be seen that the gripping operation for unlocking the connection is performed in a plane normal to the axis of the connection -i.e., laterally thereof. The device according to the invention is therefore very well adapted to operate connections by means of mechanical hands or telemanipulators.

Of course, the invention is not limited to the embodiments described but covers all variants within the scope of the invention. More particularly, it must be understood that the device according to the invention can be used for all fluid, electric or other connections on condition that they are locked and unlocked axially independently of the particular locking system which a connection of the kind specified comprises.

What I claim as my invention and desire to secure by Letters Patent is:

1. A device for separably connecting two elements end-to-end, comprising:
   a. a generally cylindrical member adapted to be secured to the end of one of the elements,
   b. a generally cylindrical body adapted to be secured to the end of the other element,
   c. means for locking said member and body in coaxial relation against axial movement away from each other,
   d. means movable axially with respect to said body to release said locking means and permit separation of said member and body,
   e. a fitting fixed to said means (d),
   f. two lever means relatively movable toward and away from each other in a direction transverse to the axes of said member and body, said lever means being carried by said fitting and movable with respect thereto, and each lever means being arranged at an acute angle with respect to the axes of said body and member, said angle opening toward the end of said body adapted to be connected to its respective element, whereby said lever means can be gripped by a mechanical hand and moved toward each other, and
   g. means carried by each lever means responsive to movement of said lever means toward each other for together applying substantially symmetrical axial forces to said body for producing relative axial movement between the body and said means (d) thereby releasing said locking means.

2. A device as set forth in claim 1 wherein said fitting is a cylindrical ring.

3. A device as set forth in claim 2 wherein each of said lever means is tangential to said ring, is mounted to pivot thereon about a radial axis, and carries an unlocking cam surface.

4. A device as set forth in claim 1 wherein each of said lever means is a bent lever having a short axially moving unlocking arm serving as said means (g), and a longer radially moving maneuvering arm.

* * * * *